(12) United States Patent
Ding et al.

(10) Patent No.: US 10,579,883 B2
(45) Date of Patent: Mar. 3, 2020

(54) METHOD AND APPARATUS FOR DETECTING A VEHICLE IN A DRIVING ASSISTING SYSTEM

(71) Applicant: BOE Technology Group Co., Ltd., Beijing (CN)

(72) Inventors: Hongli Ding, Beijing (CN); Yu Gu, Beijing (CN); Yifei Zhang, Beijing (CN); Kai Zhao, Beijing (CN); Ying Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 68 days.

(21) Appl. No.: 15/922,242

(22) Filed: Mar. 15, 2018

(65) Prior Publication Data

US 2019/0019041 A1 Jan. 17, 2019

(30) Foreign Application Priority Data

Jul. 11, 2017 (CN) .......................... 2017 1 0560448

(51) Int. Cl.
*G06K 9/00* (2006.01)
*B60W 40/04* (2006.01)
*G06T 7/70* (2017.01)
*G06K 9/62* (2006.01)

(52) U.S. Cl.
CPC ......... *G06K 9/00791* (2013.01); *B60W 40/04* (2013.01); *G06K 9/00798* (2013.01); *G06K 9/6227* (2013.01); *G06T 7/70* (2017.01); *B60W 2420/42* (2013.01)

(58) Field of Classification Search
CPC ........... G06K 9/00791; G06K 9/00798; G06K 9/6227; G06T 7/70; B60W 40/04; B60W 2420/42

USPC ......................................................... 382/104
See application file for complete search history.

(56) References Cited

U.S. PATENT DOCUMENTS

2015/0310282 A1 10/2015 Sakomoto et al.

FOREIGN PATENT DOCUMENTS

| CN | 104129389 A |   | 11/2014 |          |
|----|-------------|---|---------|----------|
| CN | 104603841 A | * | 5/2015  | G08G 1/167 |
| CN | 104603841 A |   | 5/2015  |          |
| CN | 104899554 A | * | 9/2015  |          |
| CN | 104899554 A |   | 9/2015  |          |
| CN | 105975982 A |   | 9/2016  |          |

OTHER PUBLICATIONS

Office Action for CN201710560448.2 received OA dated Jun. 10, 2019.

* cited by examiner

*Primary Examiner* — Amandeep Saini
(74) *Attorney, Agent, or Firm* — Arent Fox LLP; Michael Fainberg

(57) ABSTRACT

The disclosure discloses a method for detecting a vehicle in a driving assisting system. The method for detecting a vehicle in a driving assisting system includes: obtaining an image to be detected, and determining the positions of lane lines in the image to be detected; determining a valid area in the image to be detected, according to the positions of the lane lines, and the velocity of the present vehicle; and determining a detected vehicle in the valid area according to T preset weak classifiers, and thresholds corresponding to the respective weak classifiers, wherein T is a positive integer.

4 Claims, 3 Drawing Sheets

METHOD AND APPARATUS FOR DETECTING A VEHICLE IN A DRIVING ASSISTING SYSTEM

CROSS-REFERENCE TO RELATED APPLICATION

This application claims priority of Chinese Patent Application No. 201710560448.2, filed on Jul. 11, 2017, which is hereby incorporated by reference in its entirety.

FIELD

The present disclosure relates to the field of intelligent traffic, and particularly to a method and apparatus for detecting a vehicle in a driving assisting system.

BACKGROUND

The vehicle detection and lane line detection functions are two basic functions of an intelligent driving assisting system, and a sensor for the two functions is generally a monocular camera, where an image acquired by the camera is processed in a computer vision algorithm to obtain lane lines and a vehicle in the image, and hereby some assisting operation is performed.

SUMMARY

An embodiment of the disclosure provides a method for detecting a vehicle in a driving assisting system, the method includes: obtaining an image to be detected, and determining positions of lane lines in the image to be detected; determining a valid area in the image to be detected, according to the positions of the lane lines, and the velocity of the present vehicle; and determining a detected vehicle in the valid area according to T preset weak classifiers, and thresholds corresponding to the respective weak classifiers, wherein T is a positive integer.

In an optional implementation, in the method above for detecting a vehicle according to the embodiment of the disclosure, determining the valid area in the image to be detected according to the positions of the lane lines, and the velocity of the present vehicle includes: determining an upper boundary of the valid area in the image to be detected according to points at which the lane lines vanish; and determining a lower boundary of the valid area in the image to be detected according to the velocity of the present vehicle.

In an optional implementation, in the method above for detecting a vehicle according to the embodiment of the disclosure, determining the lower boundary of the valid area in the image to be detected in the equation of: d=k*v; wherein d is a distance between a lower boundary of the image to be detected and the lower boundary of the valid area, k is a weight coefficient, and v is the velocity of the present vehicle.

In an optional implementation, in the method above for detecting a vehicle according to the embodiment of the disclosure, determining a detected vehicle in the valid area according to the T preset weak classifiers, and the thresholds corresponding to the respective weak classifiers includes: detecting each sub-area in the valid area in sequence using a sliding box, and determining an eigenvalue corresponding to each sub-area; comparing the eigenvalue corresponding to each sub-area with first one of the T preset weak classifiers, and determining the sub-area as a candidate area in response to that the eigenvalue corresponding to the sub-area is above or equal to thresholds of all the nodes in the first weak classifier; and determining whether the value of $H_1$ for the candidate area is above or equal to a first threshold, according to the following equation, and in response to that determining that the value of $H_1$ for the candidate area is above or equal to a first threshold, comparing the value of $H_1$ with the next weak classifier in sequence, and determining that the value of $H_t$ for the candidate area is above or equal to the first threshold, until comparing the value of $H_1$ with the last weak classifier, and determining that there is a detected vehicle in the sub-area, in response to that determining that $H_T$ is above or equal to the first threshold, wherein $$H_t = \sum_{t=1}^{T} \alpha_t h_t,$$

$1 \leq t \leq T$; wherein $H_t$ a value corresponding to a t-th strong classifier, $\alpha_t$ is a weight coefficient corresponding to the t-th weak classifier, and $h_t$ is a threshold corresponding to the t-th weak classifier.

In an optional implementation, in the method above for detecting a vehicle according to the embodiment of the disclosure, determining that there is no detected vehicle in the sub-area in response to that the eigenvalue corresponding to the sub-area is below the threshold of the node in any one of the T weak classifiers.

Correspondingly an embodiment of the disclosure further provides an apparatus for detecting a vehicle in a driving assisting system, the apparatus includes: an obtaining unit configured to obtain an image to be detected, and to determine positions of lane lines in the image to be detected; and a processing unit configured to determine a valid area in the image to be detected, according to the positions of the lane lines, and the velocity of the present vehicle; and to determine a detected vehicle in the valid area according to T preset weak classifiers, and thresholds corresponding to the respective weak classifiers, wherein T is a positive integer.

In an optional implementation, in the apparatus above for detecting a vehicle according to the embodiment of the disclosure, the processing unit is configured to determine the valid area in the image to be detected, according to the positions of the lane lines, and the velocity of the present vehicle by determining an upper boundary of the valid area in the image to be detected according to points at which the lane lines vanish; and determining a lower boundary of the valid area in the image to be detected according to the velocity of the present vehicle.

In an optional implementation, in the apparatus above for detecting a vehicle according to the embodiment of the disclosure, the lower boundary of the valid area in the image to be detected is determined in the equation of: d=k*v; where d is a distance between a lower boundary of the image to be detected and the lower boundary of the valid area, k is a weight coefficient, and v is the velocity of the present vehicle.

In an optional implementation, in the apparatus above for detecting a vehicle according to the embodiment of the disclosure, the processing unit is configured to determine a detected vehicle in the valid area according to the T preset weak classifiers, and the thresholds corresponding to the respective weak classifiers by: detecting each sub-area in the valid area in sequence using a sliding box, and determining an eigenvalue corresponding to each sub-area; comparing the eigenvalue corresponding to each sub-area with first one of the T preset weak classifiers, and determining the sub-area as a candidate area in response to that the eigenvalue corresponding to the sub-area is above or equal to thresholds of all the nodes in the first weak classifier; and determining whether a value of $H_1$ for the candidate area is above or equal to a first threshold, according to the following equation, and in response to that the value of $H_1$ for the candidate area is above or equal to a first threshold, comparing the value of $H_1$ with the next weak classifier in sequence, and determining that the value of $H_t$ for the candidate area is above or equal to the first threshold, until the value of $H_1$ is compared with the last weak classifier, and determining that there is a detected vehicle in the sub-area in response to that determining that $H_T$ is above or equal to the first threshold, where $$H_t = \sum_{t=1}^{T} \alpha_t h_t,$$

$1 \leq t \leq T$; wherein $H_t$ is a value corresponding to a t-th strong classifier, $\alpha_t$ is a weight coefficient corresponding to the t-th weak classifier, and $h_t$ is a threshold corresponding to the t-th weak classifier.

In an optional implementation, in the apparatus above for detecting a vehicle according to the embodiment of the disclosure, the processing unit is further configured to determine that there is no detected vehicle in the sub-area in response to that the eigenvalue corresponding to the sub-area is below the threshold of the node in any one of the T weak classifiers.

DETAILED DESCRIPTION OF THE EMBODIMENTS

It shall be noted that specific details will be set forth in the following description to facilitate full understanding of the disclosure, but the disclosure can be embodied in a variety of other embodiments than those described here, and those skilled in the art can generalize them similarly without departing from the spirit of the disclosure, so the disclosure will not be limited to the particular embodiments as disclosed below. Some denomination as used in the description and the claims refers to a specific component. Those skilled in the art shall appreciate that the same component may be denominated by different hardware manufacturers using different names. One component will be distinguished from another component in the description and the claims by their functional difference instead of their different names. The opening term "include" or "comprise" as referred to throughout the description and the claims shall be interpreted as "include but will not be limited to". Optional embodiments of the disclosure will be described below in the description, but they are merely intended to illustrate a general principle of the disclosure instead of limiting the scope of the disclosure thereto. The scope of the disclosure as claimed shall be as defined in the appended claims.

Figure 1:
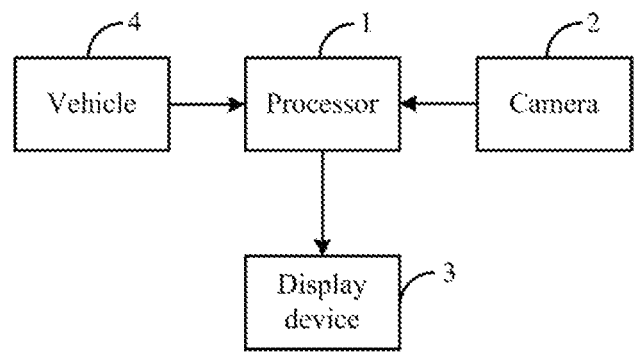
FIG. 1 is a schematic structural diagram of a driving assisting system in the related art.

As illustrated in FIG. 1, the driving assisting system in the related art includes a processor 1, a camera 2, a display device 3, and a vehicle 4, where the processor 1 is responsible for receiving and processing information from the camera 2, and also receiving velocity information from the vehicle 4 for further judgment. The processor 1 displays a processing result on the display device 3 arranged on the vehicle 4 to notify a driver of the current road condition.

In the related art, for the driving assisting system in a vehicle detecting mode, after a plurality of weak classifiers is obtained through training, an obtained image to be detected is divided into a plurality of sub-areas, and each sub-area is detected respectively for a detected vehicle. However in the obtained image to be detected, the uppermost area is generally the sky, a building, etc., and the lowermost area is generally a road on the ground, so the entire image to be detected is detected for a vehicle by detecting for a vehicle the uppermost and lowermost areas in which there is no detected vehicle, thus resulting in an additional load of computing on the processor of the present vehicle, and prolonging an operating period of time for the processor.

An embodiment of the disclosure provides a method for detecting a vehicle in a driving assisting system so as to lower a load of computing on a processor of the present vehicle detecting a front vehicle to thereby shorten an operating period of time for the processor.

Figure 2:
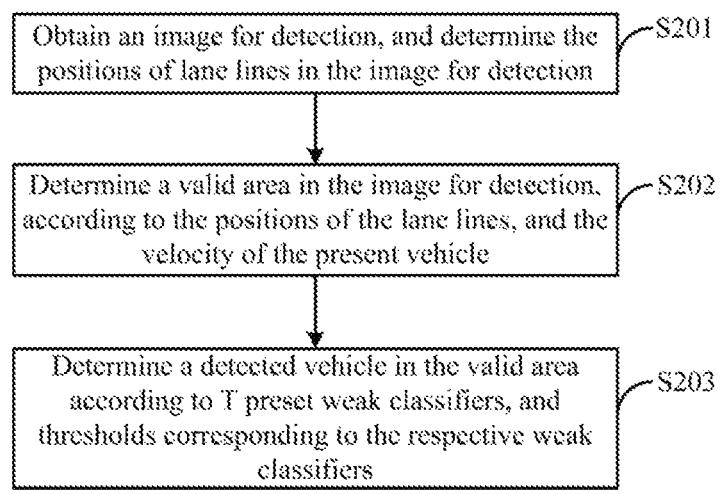
FIG. 2 is a schematic flow chart of a method for detecting a vehicle in a driving assisting system according to the embodiment of the disclosure.

Referring to FIG. 2, a method for detecting a vehicle in a driving assisting system according to an embodiment of the disclosure includes the following steps.

S201 is to obtain an image to be detected, and to determine the positions of lane lines in the image to be detected.

In the step S201, the image to be detected can be obtained in such a way that a camera installed in a vehicle takes a photo of a front condition to thereby obtain the image to be detected, or in another way, although the embodiment of the disclosure will not be limited thereto. The positions of the lane lines in the image to be detected can be determined in any one method in the related art for detecting lane lines. For example, Inverse Perspective Mapping (IPM) is performed on the obtained image to be detected, to thereby transform the image to be detected, into a top view; and then Hough transformation is performed on the top view, thereafter the top view is detected for a straight line, and further the straight line is fit using PANSAC spline curves, thus resulting in lane lines where the present vehicle is located. Generally the lane lines in the image to be detected are determined as the lane lines where the present vehicle is located, and the lane lines include lane lines which are at left and right of the present vehicle.

S202 is to determine a valid area in the image to be detected, according to the positions of the lane lines, and the velocity of the present vehicle.

It shall be noted that the valid area in the embodiment of the disclosure is a part of the area of the image to be detected, and for example, in the image to be detected, the uppermost area of the image to be detected is generally the sky, a building, etc., and the lowermost area of the image to be detected is generally a road on the ground, or the present vehicle, so an area, in which there is a detected vehicle, of the image to be detected is only the middle area other than the uppermost and lowermost areas, so the middle area is the valid area. Accordingly the valid area in the embodiment of the disclosure is only a part of the image to be detected, and apparently smaller than the image to be detected, and there is a detected vehicle in the valid area.

S203 is to determine a detected vehicle in the valid area according to T preset weak classifiers, and thresholds corresponding to the respective weak classifiers, where T is a positive integer.

Generally a vehicle is generally detected in two flows of training and detection, where the training flow is primarily performed to obtain the T weak classifiers, and the thresholds corresponding to the respective weak classifiers, and the detection flow is primarily performed to detect the image in the valid area for the position of a detected vehicle, using the weak classifiers obtained through training. Optionally in the embodiment of the disclosure, the T preset weak classifiers can be obtained in any one training method in the related art, although the embodiment of the disclosure will not be limited thereto.

For example, the training flow includes the following operations.

(1) Images including vehicles are collected and annotated, and vehicle areas in the images are extracted and scaled into pictures with a fixed size, which are positive samples for training; and a preset number of areas including no vehicle areas are extracted from the images, and scaled into the same size as the positive samples, thus resulting in negative samples for training.

(2) Eigenvalues of the positive samples and the negative samples are calculated respectively, where the eigenvalues include ten channel eigenvalues, which are an LUV image channel, directional gradient histogram channels in six directions, and an image gradient amplitude channel, and the calculated ten channel eigenvalues are normalized into eigenvalues for training.

(3) The calculated eigenvalues of the positive samples and the negative samples are trained in the adaboost algorithm to obtain a plurality of strong classifiers, each of which is consisted of T (T is a positive integer) weak classifiers, and the weak classifiers in the embodiment of the disclosure are obtained by training the plurality of positive samples including vehicles, and the plurality of negative vehicles including no vehicles. The weak classifiers can be obtained in binary decision tree, logic regression, neutral network, or other algorithms. Here the weak classifiers will be determined in a binary decision tree algorithm, for example, although the embodiment of the disclosure will not be limited thereto.

Figure 3:
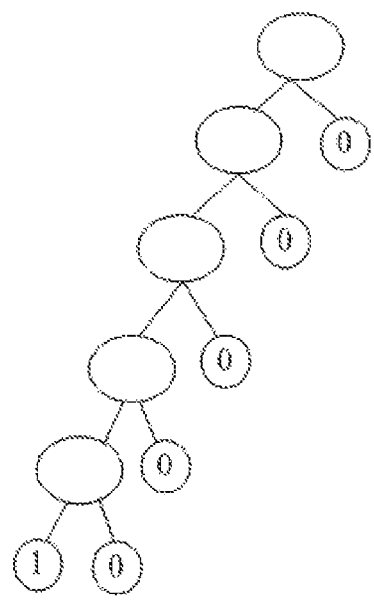
FIG. 3 is a schematic structural diagram of a weak classifier according to the embodiment of the disclosure.

Each weak classifier is a binary decision tree as illustrated in FIG. 3, where the depth of each weak classifier can be 5 levels or more than 5 or less than 5, although the embodiment of the disclosure will not be limited thereto. Values of nodes in the decision tree of each weak classifier are thresholds obtained through training, and an eigenvalue corresponding to an area for detection is compared with the thresholds in the decision tree of the weak classifier so that the area can be determined as a positive sample or a negative sample. The last row of each weak classifier can be determined as a positive sample or a negative sample. Referring to FIG. 3, 1 represents a positive sample, and 0 represents a negative sample. As illustrated in FIG. 3, an ellipse represents a threshold corresponding to a node of a weak classifier for judgment, and when an eigenvalue of a sub-area is above a threshold corresponding to a node, judgment is made for the next node until it is judged that the eigenvalue corresponding to the sub-area is 0 or 1; and a circle represents a terminal after the judgment, that is, the judgment is made so that the value corresponding to the eigenvalue of the sub-area is 0 or 1, and if the value is 0, then the sub-area will be determined as a negative sample; otherwise, the sub-area will be determined as a positive sample.

Here the T weak classifiers are configured to detect the valid area for a vehicle to thereby determine whether there is a detected vehicle in the valid area. How to determine whether there is a detected vehicle will be further described below in details using the weak classifiers.

In the method for detecting a vehicle in a driving assisting system according to the embodiment of the disclosure, firstly an image to be detected is obtained, and the positions of lane lines in the image to be detected are determined; then a valid area in the image to be detected is determined according to the positions of the lane lines, and the velocity of the present vehicle; and finally a detected vehicle in the valid area is determined according to T preset weak classifiers, and thresholds corresponding to the respective weak classifiers. Accordingly in the embodiment of the disclosure, a vehicle is only detected in the valid area in the image to be detected to thereby determine a detected vehicle. As compared with the related art, the image to be detected is detected for a vehicle, in the method for detecting a vehicle according to the embodiment of the disclosure, only in the valid area which is significantly smaller than the image to be detected, to thereby lower a load of computing on the processor of the present vehicle detecting a front vehicle so as to shorten an operating period of time for the processor.

In an optional embodiment, in the method for detecting a vehicle according to the embodiment of the disclosure, the step 202 of determining the valid area in the image to be detected according to the positions of the lane lines, and the velocity of the present vehicle includes: determining an upper boundary of the valid area in the image to be detected according to points at which the lane lines vanish; and determining a lower boundary of the valid area in the image to be detected according to the velocity of the present vehicle.

Optionally in the embodiment of the disclosure, a sky area or a building area, and a ground area, or a vehicle body area of the present vehicle, in the image to be detected are removed, so that the remaining area is determined as the valid area; and after the valid area is determined, only the valid area is detected for a vehicle to thereby reduce the number of times that a vehicle is detected, so as to lower a load of computing on the processor, where the lane lines in the image to be detected are typically two lane lines, and the two lane lines exactly in front of the present vehicle are approaching each other at an increasing distance until they vanish. Accordingly the valid area is determined by determining the ordinate of the intersection between the present two lane lines (on a line extending in the horizontal direction including the intersection) as the upper boundary of the valid area. Since there is a changing velocity of the present vehicle, there is a varying picture of the obtained image to be detected, and there is also a distance from the photographed front vehicle, so the lower boundary of the valid area can be determined according to the velocity of the present vehicle.

In an optional embodiment, a number of experiments are conducted repeatedly, and the lower boundary of the valid area in the image to be detected can be determined according to data obtained in the number of experiments in the equation of $d=k*v$; (1), where d is the distance between a lower boundary of the image to be detected and the lower boundary of the valid area, k is a weight coefficient, and v is the velocity of the present vehicle.

In the embodiment of the disclosure, Equation (1) is derived through a number of experiment and mathematical modeling as follows: for example, the ground area is initially set as 10% of the area of the image to be detected; then a data statistic is made of the distances between the lower boundary of the valid area and the lower boundary of the image to be detected under different conditions, and a statistic is made respectively of the velocity v of the present vehicle, and the value of the lower boundary d corresponding to the velocity; and next the statistics are modeled linearly through linear regression to thereby derive Equation (1) above. The position of the lower boundary d can be selected dynamically using the equation directly to thereby narrow the detection area in the vehicle detection process so as to improve the speed of vehicle detection.

It shall be noted that in the embodiment of the disclosure, the position of the lower boundary of the valid area is determined only according to the velocity of the present vehicle. In a real application, the position of the lower boundary of the valid area can be determined more precisely according to other additional factors, e.g., the curvature of a road, etc., so a data statistic can be made respectively of the velocity of the preset vehicle, the curvature of the current road, and other factors to thereby create a mathematical model through linear regression so as to determine the position of the lower boundary of the valid area. Accordingly any method for determining the valid area by calculating the position of the lower boundary of the valid area through making a data statistic shall come into the scope of the disclosure as claimed.

In an optional embodiment, in the method above for detecting a vehicle according to the embodiment of the disclosure, the step S203 of determining a detected vehicle in the valid area according to the T preset weak classifiers, and the thresholds corresponding to the respective weak classifiers includes following operations.

Detecting each sub-area in the valid area in sequence using a sliding box, and determining an eigenvalue corresponding to each sub-area.

Comparing the eigenvalue corresponding to each sub-area with first one of the T preset weak classifiers, and if the eigenvalue corresponding to the sub-area is above or equal to thresholds of all the nodes in the first weak classifier, then determining the sub-area as a candidate area.

Determining whether the value of $H_1$ for the candidate area is above or equal to a first threshold, according to the following equation, and if so, then comparing the value of $H_1$ with the next weak classifier in sequence, and determining that the value of $H_1$ for the candidate area is above or equal to the first threshold, until comparing the value of $H_1$ with the last weak classifier, and determining that $H_T$ is above or equal to the first threshold, so it is determined that there is a detected vehicle in the sub-area, where $$H_t = \sum_{t=1}^{T} \alpha_t h_t,$$

$1 \leq t \leq T$; (2), where $H_t$ is a value corresponding to the t-th strong classifier, $\alpha_t$ is a weight coefficient corresponding to the t-th weak classifier, and $h_t$ is a threshold corresponding to the t-th weak classifier.

Figure 4:
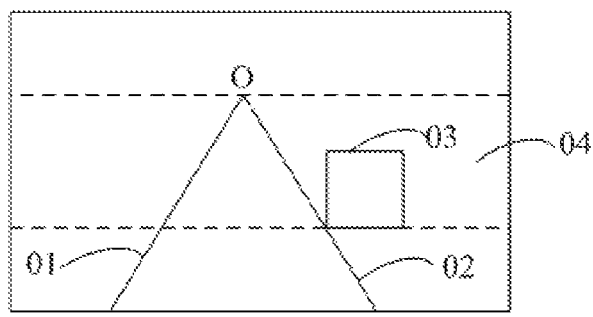
FIG. 4 is a distribution diagram of areas in an image to be detected, according to the embodiment of the disclosure.

Optionally in the image to be detected as illustrated in FIG. 4, the upper boundary of the valid area is determined by the intersection O between the lane line 01 and the lane line 02, the lower boundary of the valid area is determined in Equation (1) above, and the area surrounded by two dotted lines, and the boundaries of the image to be detected in FIG. 4 is the valid area 03.

The valid area is detected for a vehicle in the following steps.

In the first step, the valid area 03 is detected for a vehicle using a sliding box 04, where a sub-area is determined each time the sliding box 04 is moved, and the image in the sub-area is detected for a vehicle by comparing an eigenvalue in the sub-area with the thresholds of the T weak classifiers.

For example, there are T weak classifiers, each of which can be structured as illustrated in FIG. 3, and the eigenvalue in the sub-area determined using the sliding box is compared with the thresholds of the nodes in the decision tree of the first weak classifier; and referring to FIG. 3 which illustrates a weak classifier, optionally the eigenvalue corresponding to the sub-area is compared with the first node in the decision tree of the weak classifier, and if the eigenvalue corresponding to the sub-area is below the threshold of the first node, then the sub-area will be determined as a negative sample, and discarded directly; and if the eigenvalue corresponding to the sub-area is compared with the first node in the decision tree of the weak classifier, and the eigenvalue corresponding to the sub-area is above or equal to the threshold of the first node, then the eigenvalue will be further compared with the second node, and alike the eigenvalue will be compared with the thresholds of the respective nodes in sequence until the value of 1 is obtained for the sub-area as a result of a number of judgments, so the sub-area is determined as a candidate area possibly including an object.

It is determined in sequence as in the first step whether the respective sub-areas are an area possibly including an object or not, and each sub-area possibly including an object is a candidate area.

In the second step, after the sub-area is a candidate area as a result of judgment using a weak classifier (e.g., the first weak classifier), the threshold $h_1$ corresponding to the first weak classifier is multiplied with the weight coefficient $\alpha_1$ corresponding to the first weak classifier, and the product $\alpha_1 h_1$ is compared with the first threshold, where the first threshold is typically −1, or can be another value, although the embodiment of the disclosure will not be limited thereto. If $\alpha_1 h_1$ is above the first threshold, then the candidate area will be compared with the next weak classifier (e.g., the second weak classifier), it will be determined as in the first step whether the value of 0 or 1 is obtained for the sub-area as a result of judgment, and if the value is 0, then the candidate area will be discarded; otherwise, the threshold $h_2$ corresponding to the second weak classifier will be multiplied with the weight coefficient $\alpha_2$ corresponding to the second weak classifier, and the value of $h_1\alpha_1+h_2\alpha_2$ will be compared with the first threshold. If $h_1\alpha_1+h_2\alpha_2$ is below the first threshold, then the candidate area will be discarded; otherwise, the candidate area will be further compared with the third weak classifier until the candidate area is compared with the T-th weak classifier, and the value of $$H_T = \sum_{t=1}^{T} \alpha_t h_t$$

is above or equal to the first threshold, so the candidate area is determined as an object area including a vehicle to be detected.

It shall be noted that if the value of 0 is obtained as a result of judgment using any one weak classifier (e.g., the first weak classifier) in the first step, then the sub-area will be discarded directly, and no further judgment will be made; and if the value of 1 is obtained as a result of judgment using the i-th weak classifier in the first step, then the sub-area will be determined as a candidate area, it will be determined whether $\alpha_i h_i + \ldots + \alpha_2 h_2 + \alpha_1 h_1$ is above or equal to the first threshold, and if so, then judgment will be further made using the (i+1)-th weak classifier; otherwise, the sub-area will be discarded directly, and no further judgment will be made.

In the third step, the sliding box is moved sequentially as in the first and second step, and each sub-area is determined in sequence for a detected vehicle.

As can be apparent, a sub-area corresponding to the sliding box is determined each time the sliding box is moved, and judgment is made as to whether there is a detected vehicle in the sub-area under two conditions: one condition is that all the eigenvalue corresponding to the sub-area is more than the eigenvalues corresponding to the nodes in the T weak classifiers; and the other condition is that $H_T$ obtained in Equation (2) above using the thresholds corresponding to the T weak classifiers is above or equal to the first threshold, where the first threshold can be −1 or another value.

It shall be noted that there may be a number of vehicles in the valid area, and a vehicle at a longer distance from the present vehicle according to the position where the vehicle is photographed appears smaller, and has a lower possibility of collision with the present vehicle. In order to further reduce the number of times that the valid area is detected for a vehicle, and to preclude such a detected vehicle that is at a longer distance from the current vehicle, and that has a lower possibility of collision, the sliding box in the embodiment of the disclosure can be enlarged adaptively so that the number of pixels corresponding to the sliding box is above a second threshold which can be determined as needed in reality, where the second threshold can be determined by, for example, making a statistic of the sizes of a detected vehicle in a plurality of images acquired in the present vehicle, determining the number of pixels occupied by the detected vehicle, and then determining the range of the second threshold according to the number of pixels of the detected vehicle captured in the plurality of images.

In the embodiment of the disclosure, the number of pixels corresponding to the sliding box is set above the second threshold to thereby further reduce the number of times that the valid area is detected for a vehicle, and since the second threshold is determined according to the size of the detected vehicle, the valid area is detected for a vehicle using the sliding box of that size to thereby further preclude a detected vehicle at a longer distance from the present vehicle so as to determine in valid a detected vehicle at a shorter distance from the present vehicle.

In an optional embodiment, in the method above for detecting a vehicle according to the embodiment of the disclosure, if the eigenvalue corresponding to the sub-area is below the threshold of the node in any one of the T weak classifiers, then it will be determined that there is no detected vehicle in the sub-area.

Optionally when the eigenvalue corresponding to the sub-area does not satisfy either of the two conditions above, it is determined that there is no detected vehicle in the sub-area.

Figure 5:
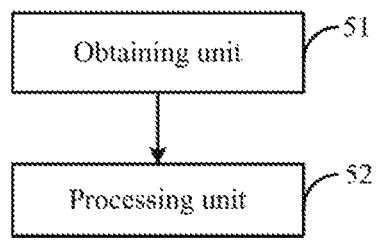
FIG. 5 is a schematic structural diagram of an apparatus for detecting a vehicle in a driving assisting system according to the embodiment of the disclosure.

Based upon the same inventive idea, referring to FIG. 5, an apparatus for detecting a vehicle in a driving assisting system according to an embodiment of the disclosure includes followings.

An obtaining unit 51 is configured to obtain an image to be detected, and to determine the positions of lane lines in the image to be detected.

A processing unit 52 is configured to determine a valid area in the image to be detected, according to the positions of the lane lines, and the velocity of the present vehicle; and to determine a detected vehicle in the valid area according to T preset weak classifiers, and thresholds corresponding to the respective weak classifiers, where T is a positive integer.

In an optional embodiment, in the apparatus above for detecting a vehicle according to the embodiment of the disclosure, the processing unit 52 configured to determine the valid area in the image to be detected, according to the positions of the lane lines, and the velocity of the present vehicle is configured to determine an upper boundary of the valid area in the image to be detected according to points at which the lane lines vanish; and to determine a lower boundary of the valid area in the image to be detected according to the velocity of the present vehicle.

In an optional embodiment, in the apparatus above for detecting a vehicle according to the embodiment of the disclosure, the lower boundary of the valid area in the image to be detected is determined in the equation of d=k*v; where d is the distance between a lower boundary of the image to be detected and the lower boundary of the valid area, k is a weight coefficient, and v is the velocity of the present vehicle.

In an optional embodiment, in the apparatus above for detecting a vehicle according to the embodiment of the disclosure, the processing unit 52 configured to determine a detected vehicle in the valid area according to the T preset weak classifiers, and the thresholds corresponding to the respective weak classifiers is configured to detect each sub-area in the valid area in sequence using a sliding box, and to determine an eigenvalue corresponding to each sub-area; to compare the eigenvalue corresponding to each sub-area with first one of the T preset weak classifiers, and if the eigenvalue corresponding to the sub-area is above or equal to thresholds of all the nodes in the first weak classifier, to determine the sub-area as a candidate area; and to determine whether the value of $H_1$ for the candidate area is above or equal to a first threshold, according to the following equation, and if so, to compare the value of $H_1$ with the next weak classifier in sequence, and to determine that the value of $H_t$ for the candidate area is above or equal to the first threshold, until the value of $H_1$ is compared with the last weak classifier, and it is determined that $H_T$ is above or equal to the first threshold, so it is determined that there is a detected vehicle in the sub-area, where $$H_t = \sum_{t=1}^{T} \alpha_t h_t,$$

$1 \le t \le T$; where $H_t$ is a value corresponding to the t-th strong classifier, $\alpha_t$ is a weight coefficient corresponding to the t-th weak classifier, and $h_t$ is a threshold corresponding to the t-th weak classifier.

In an optional embodiment, in the apparatus above for detecting a vehicle according to the embodiment of the disclosure, the processing unit 52 is further configured to determine that there is no detected vehicle in the sub-area if the eigenvalue corresponding to the sub-area is below the threshold of the node in any one of the T weak classifiers.

In summary, in the method for detecting a vehicle in a driving assisting system according to the embodiment of the disclosure, firstly an image to be detected is obtained, and the positions of lane lines in the image to be detected are determined; then a valid area in the image to be detected is determined according to the positions of the lane lines, and the velocity of the present vehicle; and finally a detected vehicle in the valid area is determined according to T preset weak classifiers, and thresholds corresponding to the respective weak classifiers. Accordingly in the embodiment of the disclosure, a vehicle is only detected in the valid area in the image to be detected to thereby determine a detected vehicle. As compared with the related art, the image to be detected is detected for a vehicle, in the method for detecting a vehicle according to the embodiment of the disclosure, only in the valid area which is significantly smaller than the image to be detected, to thereby lower a load of computing on the processor of the present vehicle detecting a front vehicle so as to shorten an operating period of time for the processor.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for detecting a vehicle in a driving assisting system, the method comprises:

obtaining an image to be detected, and determining positions of lane lines in the image to be detected;

determining a valid area in the image to be detected, according to the positions of the lane lines, and a velocity of a present vehicle; and determining a detected vehicle in the valid area according to T preset weak classifiers, and thresholds corresponding to respective weak classifiers, wherein T is a positive integer;

wherein determining the valid area in the image to be detected according to the positions of the lane lines, and the velocity of the present vehicle comprises:

determining an upper boundary of the valid area in the image to be detected according to points at which the lane lines vanish; and determining a lower boundary of the valid area in the image to be detected according to the velocity of the present vehicle;

wherein determining the lower boundary of the valid area in the image to be detected in the equation of:

$$d=k*v;$$

wherein d is a distance between a lower boundary of the image to be detected and the lower boundary of the valid area, k is a weight coefficient, and v is the velocity of the present vehicle;

wherein determining the detected vehicle in the valid area according to the T preset weak classifiers, and the thresholds corresponding to the respective weak classifiers comprises:

detecting each sub-area in the valid area in sequence using a sliding box, and determining an eigenvalue corresponding to each sub-area;

comparing the eigenvalue corresponding to each sub-area with first one of the T preset weak classifiers, and determining the sub-area as a candidate area in response to that the eigenvalue corresponding to the sub-area is above or equal to thresholds of all the nodes in the first weak classifier; and determining whether a value of $H_1$ for the candidate area is above or equal to a first threshold, according to a following equation, and in response to that the value of $H_1$ for the candidate area is above or equal to a first threshold, comparing the value of $H_1$ with the next weak classifier in sequence, and determining that the value of $H_t$ for the candidate area is above or equal to the first threshold, until comparing the value of $H_1$ with a last weak classifier, and determining that there is a detected vehicle in the sub-area, in response to that determining that $H_T$ is above or equal to the first threshold, wherein:

$$H_t = \sum_{t=1}^{T} \alpha_t h_t,$$

$1 \leq t \leq T$;

wherein $H_t$ is a value corresponding to the t-th strong classifier, $\alpha_t$ is a weight coefficient corresponding to a t-th weak classifier, and $h_t$ is a threshold corresponding to the t-th weak classifier.

2. The method according to claim 1, further comprising: determining that there is no detected vehicle in the sub-area in response to that the eigenvalue corresponding to the sub-area is below the threshold of the node in any one of the T weak classifiers.

3. An apparatus for detecting a vehicle in a driving assisting system, the apparatus comprises a memory and at least one processor, wherein the memory is configured to store readable program codes, and the at least one processor is configured to execute the readable program codes to:

obtain an image to be detected, and to determine positions of lane lines in the image to be detected; and determine a valid area in the image to be detected, according to the positions of the lane lines, and a velocity of the present vehicle; and to determine a detected vehicle in the valid area according to T preset weak classifiers, and thresholds corresponding to the respective weak classifiers, wherein T is a positive integer;

wherein the at least one processor is configured to execute the readable program codes to determine the valid area in the image to be detected, according to the positions of the lane lines, and the velocity of the present vehicle by:

determining an upper boundary of the valid area in the image to be detected according to points at which the lane lines vanish; and determining a lower boundary of the valid area in the image to be detected according to the velocity of the present vehicle;

wherein the lower boundary of the valid area in the image to be detected is determined in the equation of:

$d = k * v$;

wherein d is a distance between a lower boundary of the image to be detected and the lower boundary of the valid area, k is a weight coefficient, and v is the velocity of the present vehicle;

wherein the at least one processor is configured to execute the readable program codes to determine the detected vehicle in the valid area according to the T preset weak classifiers, and the thresholds corresponding to the respective weak classifiers by:

detecting each sub-area in the valid area in sequence using a sliding box, and to determine an eigenvalue corresponding to each sub-area;

comparing the eigenvalue corresponding to each sub-area with first one of the T preset weak classifiers, and determining the sub-area as a candidate area in response to that the eigenvalue corresponding to the sub-area is above or equal to thresholds of all the nodes in the first weak classifier; and determining whether a value of $H_1$ for the candidate area is above or equal to a first threshold, according to a following equation, and in response to that the value of $H_1$ for the candidate area is above or equal to a first threshold, comparing the value of $H_1$ with the next weak classifier in sequence, and determining that the value of $H_t$ for the candidate area is above or equal to the first threshold, until the value of $H_1$ is compared with the last weak classifier, and in response to that it is determined that $H_T$ is above or equal to the first threshold, determining that there is a detected vehicle in the sub-area, wherein:

$$H_t = \sum_{t=1}^{T} \alpha_t h_t,$$

$1 \leq t \leq T$;

wherein $H_t$ is a value corresponding to a t-th strong classifier, $\alpha_t$ is a weight coefficient corresponding to the t-th weak classifier, and $h_t$ is a threshold corresponding to the t-th weak classifier.

4. The apparatus according to claim 3, wherein the at least one processor is further configured to execute the readable program codes to determine that there is no detected vehicle in the sub-area in response to that the eigenvalue corresponding to the sub-area is below the threshold of the node in any one of the T weak classifiers.

\* \* \* \* \*